G. W. FISHER.
Shafting-Hanger.
No. 224,821. Patented Feb. 24, 1880.
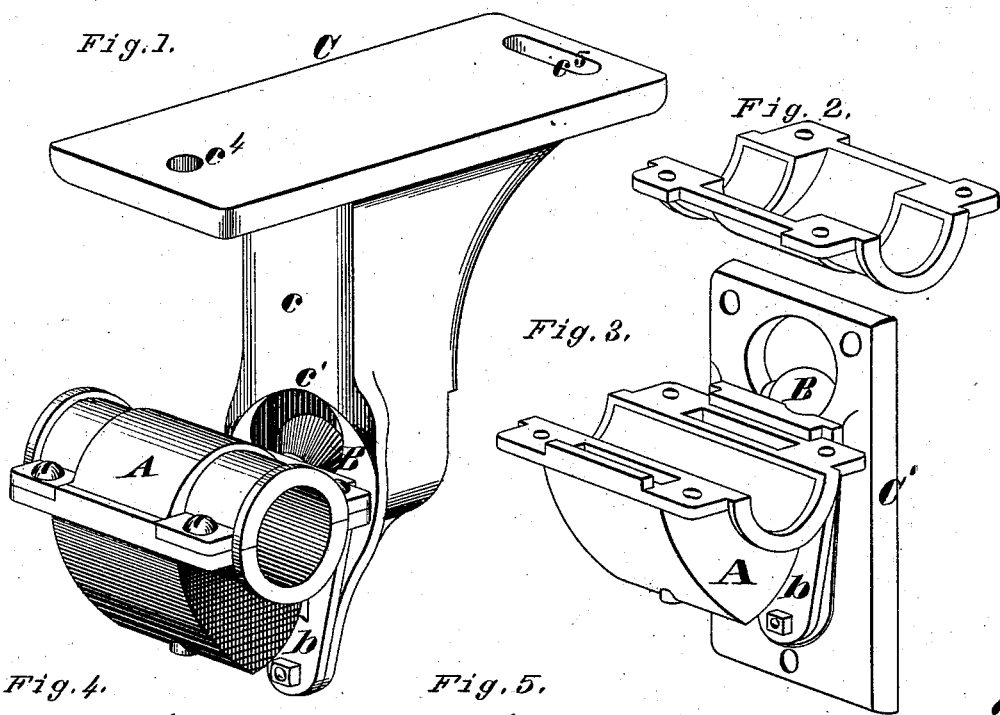
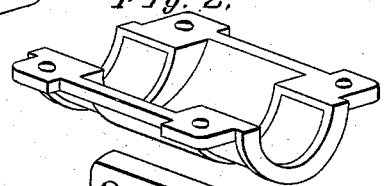
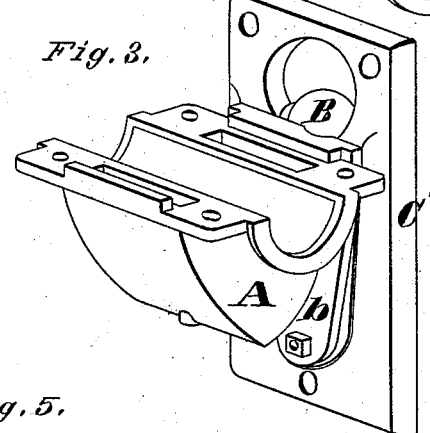
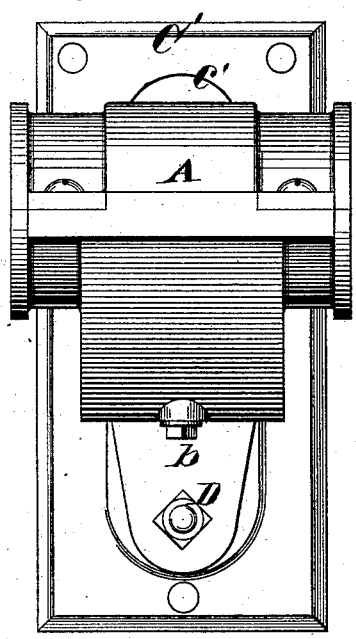
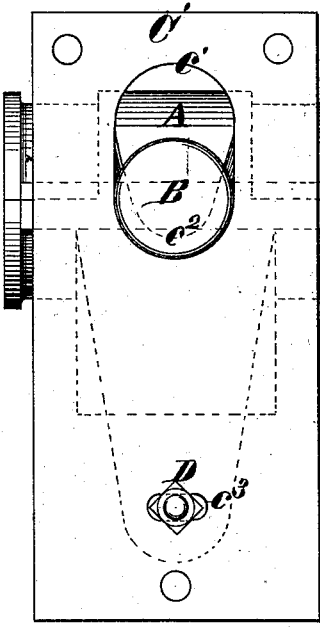
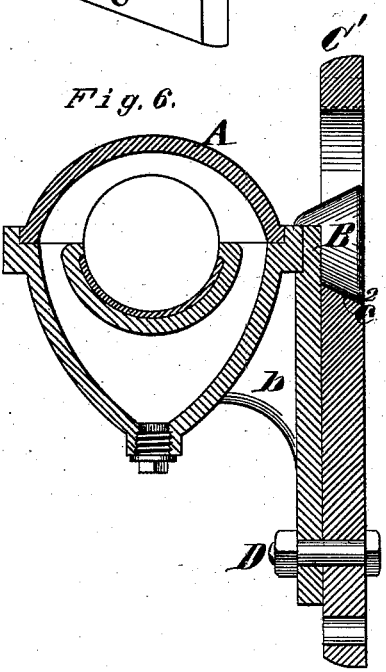
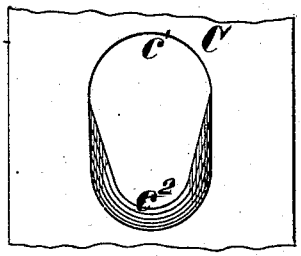
Attest:
Charles Pickles
Ernl. S. Boyd
Inventor,
George W. Fisher
by Chas. D. Moody.
atty.

UNITED STATES PATENT OFFICE.

GEORGE W. FISHER, OF ST. LOUIS, MISSOURI, ASSIGNOR TO CHARLES B. FISHER, OF SAME PLACE.

SHAFTING-HANGER.

SPECIFICATION forming part of Letters Patent No. 224,821, dated February 24, 1880.

Application filed January 3, 1880.

*To all whom it may concern:*

Be it known that I, GEORGE W. FISHER, of St. Louis, Missouri, have made a new and useful Improvement in Shafting-Hangers, of which the following is a full, clear, and exact description, reference being had to the annexed drawings, making part of this specification, in which—

Figure 1 is a view, in perspective, of the improvement as embodied in a drop-hanger; Fig. 2, a perspective of the cover of the shafting-box; Fig. 3, a perspective showing the improvement in connection with a post-bracket, the cover of the box being removed; Fig. 4, a front elevation of the last-named modification, the cover in place; Fig. 5, a rear elevation; Fig. 6, a vertical section; and Fig. 7, a detail, being a view from the rear, showing the opening in which the projection upon a box engages.

The same letters denote the same parts.

My aim is to furnish an improved means for attaching the journal-box to the hanger, and for enabling it to be self-adjusting therein.

The improvement also relates to the provision for readily adjusting the hanger, when of the drop-hanger form, to the line of the shafting.

Referring to the drawings, A represents a journal-box, which, so far as this improvement is concerned, may be of any of the customary forms. Upon its inner side it is furnished with a projection, B, by means whereof the box is attached to the hanger. The projection serves, primarily, to connect the box and hanger, and so far as this only is concerned it may be a simple tenon fitting into a mortise or opening in the hanger, and there held by any suitable means, such as a nut, pin, or key upon or passing through its inner end; but to facilitate and to provide for bringing the box into the desired position with relation to the shafting, the projection upon its under side, and also that part of the opening in the hanger upon which the projection rests, are so shaped as to enable the projection to turn or rock in its bearing and allow the box thereby to adjust itself accurately in line with the shafting. The preferable form for effecting this is a rounded bearing in the hanger and a rounded surface upon the under side of the projection; and to enable the box to be drawn against the hanger the projection as well as the inner side of the opening in the hanger are beveled, as shown. The opening in the hanger is also preferably made tapering, narrowing at its lower end to fit the neck of the projection.

C represents a drop-hanger, in the pendant $c$ of which is the opening $c'$ to receive the projection B. The shape of the opening upon its inner side is shown at $c^2$, Fig. 5, 6, 7. The box is attached to the hanger by passing the projection B through the opening in the hanger and allowing it to drop down into the bearing at the bottom of the opening. The projection B, in effect, is a dovetail ear or hook, rounded upon its under side and fitting into a recess of corresponding form in the hanger.

If desired, the box, after being adjusted in the hanger, can be fastened, so as to prevent its turning in the hanger, by means of a bolt, D, which fastens a plate, $b$, with which the box is furnished, to the pendant $c$. To suit any variance of the shafting from a horizontal line, the perforation in one of the parts—say in the pendant—is elongated, as shown at $c^3$, Fig. 5.

To enable the drop-hanger C to be readily adjusted to the direction of the line of shafting, it is perforated at $c^4$, directly over the center of the box A beneath. At the other end of the hanger is another perforation, $c^5$, preferably elongated. The bolts for attaching the hanger to the ceiling pass through these openings. That through the perforation $c^4$ is put through first, and the hanger thereby held approximately in place. The hanger is then adjusted accurately to the shafting, and then the bolts in both of the perforations $c^4$ $c^5$ are tightened. By reason of the perforation $c^4$ being over the center of the box the hanger is self-adjusting to the line of the shafting.

The improvement is applicable equally to a drop-hanger, C, a post-bracket, C', a pedestal, or any fixture used to support shafting. In all cases the recess or opening $c'$ and the projection B are formed as above described, and the engagement of the box and hanger is similarly effected.

I claim—

1. The combination of a journal-box, A, and a shafting-hanger, said box having the projection B, and said hanger having the recess $c'$, substantially as described.

2. The combination of a journal-box having a dovetail ear or hook, and a shafting-hanger having a recess, in which said ear or hook engages for the purpose of fastening and drawing the box and hanger together.

3. The combination of a journal-box having a dovetail tenon, and a shafting-hanger having a recess to receive said tenon, said recess, at its upper end, being large enough to receive the tenon, and narrowing toward its lower end to fit the neck of the tenon, substantially as described.

4. The combination of the box A, having the projection B and plate $b$, and the hanger C, having the recess $c'$ and perforation $c^3$, and the bolt D, substantially as described.

5. The hanger C, having the perforation $c^4$ directly over the center of the box A, for the purpose described.

6. The hanger C, having the perforations $c^4$ $c^5$, arranged as described, and the box A, combined and operating substantially as described.

GEO. W. FISHER.

Witnesses:
CHAS. D. MOODY,
SAML. S. BOYD.